(12) United States Patent
Anderson

(10) Patent No.: US 8,939,266 B2
(45) Date of Patent: Jan. 27, 2015

(54) COMPOSITE BRAKE DISC

(75) Inventor: Brian Keith-Robert Anderson, South Lyon, MI (US)

(73) Assignee: Rassini Frenos, S.A. DE C.V., Plymouth, MI (US)

( * ) Notice: Subject to any disclaimer, the term of this patent is extended or adjusted under 35 U.S.C. 154(b) by 316 days.

(21) Appl. No.: 12/736,763

(22) PCT Filed: May 8, 2009

(86) PCT No.: PCT/US2009/002880
§ 371 (c)(1),
(2), (4) Date: Nov. 5, 2010

(87) PCT Pub. No.: WO2009/137101
PCT Pub. Date: Nov. 12, 2009

(65) Prior Publication Data
US 2011/0061980 A1    Mar. 17, 2011

Related U.S. Application Data

(60) Provisional application No. 61/127,272, filed on May 8, 2008.

(51) Int. Cl.
*F16D 65/12* (2006.01)
*B22C 9/10* (2006.01)
(Continued)

(52) U.S. Cl.
CPC . *F16D 65/12* (2013.01); *B22C 9/10* (2013.01); *B22D 19/0081* (2013.01);
(Continued)

(58) Field of Classification Search
CPC .................................. B22C 9/10; F16D 65/12
USPC ......... 188/18 A, 218 XL, 218 R; 164/98–112
See application file for complete search history.

(56) References Cited

U.S. PATENT DOCUMENTS 5,109,960 A * 5/1992 Gunther .................. 188/218 XL
5,184,663 A * 2/1993 Oono et al. ..................... 164/98
(Continued)

FOREIGN PATENT DOCUMENTS

| CN | 1452532 A | 10/2003 |
|---|---|---|
| GB | 1323832 A | 7/1973 |
| WO | 2009137101 A2 | 11/2009 |

OTHER PUBLICATIONS

Chinese Office Action for Application No. 200980122560.1 dated Mar. 4, 2013 with English translation; 14 pages.

(Continued)

*Primary Examiner* — Robert A Siconolfi
*Assistant Examiner* — Charles Poon
(74) *Attorney, Agent, or Firm* — Cantor Colburn LLP

(57) ABSTRACT

A brake disc arrangement has a mounting portion formed of a metal, with a plurality of radial protuberances extending radially outward therefrom. The radial protuberances each have a radially distal tip portion, and a ceramic coating is applied to the radially distal tip portion of the radial protuberances. The brake plate portion is cast so as to surround the radially distal tip portions. However, it is isolated therefrom by the ceramic coating. At least some of the radially distal tip portions are formed of metal having a microstructure created by electrical discharge machining to increase dampening. A sand core within a core box holds the mounting portion in a predetermined fixed orientation. The molten metal is poured into the core box mold, and the metal brake plate portion is prevented by the ceramic coating from welding to any of the plurality of radial protuberances.

4 Claims, 6 Drawing Sheets

(51) Int. Cl.
  *B22D 19/00* (2006.01)
  *B22D 19/16* (2006.01)
  *F16D 65/02* (2006.01)

(52) U.S. Cl.
  CPC ....... *B22D 19/16* (2013.01); *F16D 2065/1316* (2013.01); *F16D 2065/1344* (2013.01); *F16D 2065/136* (2013.01); *F16D 2250/0015* (2013.01)
  USPC .................................................. 188/218 XL

(56) References Cited

U.S. PATENT DOCUMENTS

| | | | | |
|---|---|---|---|---|
| 5,374,319 | A * | 12/1994 | Stueber et al. ................. | 148/404 |
| 5,862,892 | A * | 1/1999 | Conley ..................... | 188/218 XL |
| 6,131,707 | A * | 10/2000 | Buechel et al. ......... | 188/218 XL |
| 6,164,423 | A * | 12/2000 | Dickerson ................ | 188/218 XL |
| 6,267,209 | B1 * | 7/2001 | Gross et al. ............. | 188/218 XL |
| 6,505,716 | B1 * | 1/2003 | Daudi et al. ............... | 188/250 B |
| 6,564,912 | B1 * | 5/2003 | Koschinat ................ | 188/218 XL |
| 2001/0040075 | A1 * | 11/2001 | Daudi et al. ............ | 188/218 XL |
| 2002/0117286 | A1 * | 8/2002 | Fujita ................ | 164/97 |
| 2004/0163902 | A1 * | 8/2004 | Meroni et al. .......... | 188/218 XL |
| 2004/0178031 | A1 * | 9/2004 | Gotti et al. .............. | 188/218 XL |
| 2007/0062768 | A1 * | 3/2007 | Hanna et al. ............ | 188/218 XL |
| 2007/0199778 | A1 * | 8/2007 | Lee ......................... | 188/218 XL |
| 2009/0078515 | A1 * | 3/2009 | Xia ........................ | 188/218 XL |
| 2011/0290602 | A1 * | 12/2011 | Kleber et al. ........... | 188/218 XL |

OTHER PUBLICATIONS

Written Opinion of International Searching Authority dated Oct. 4, 2009; International Application No. PCT/US2009/002880; international mailing date Oct. 16, 2009; 5 pages.

International Search Report dated Oct. 4, 2009; International Application No. PCT/US2009/002880; international mailing date Oct. 16, 2009; 3 pages.

* cited by examiner

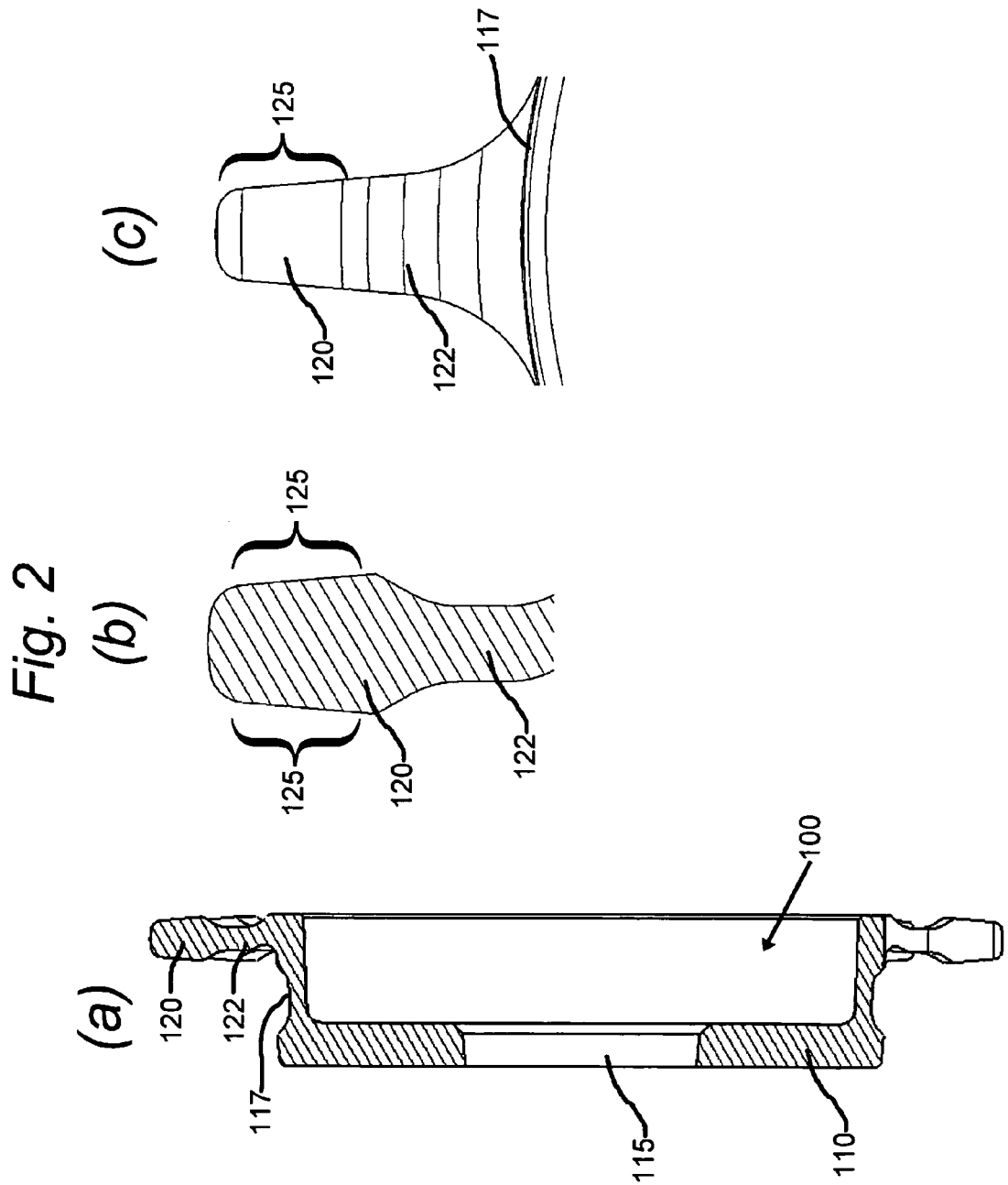

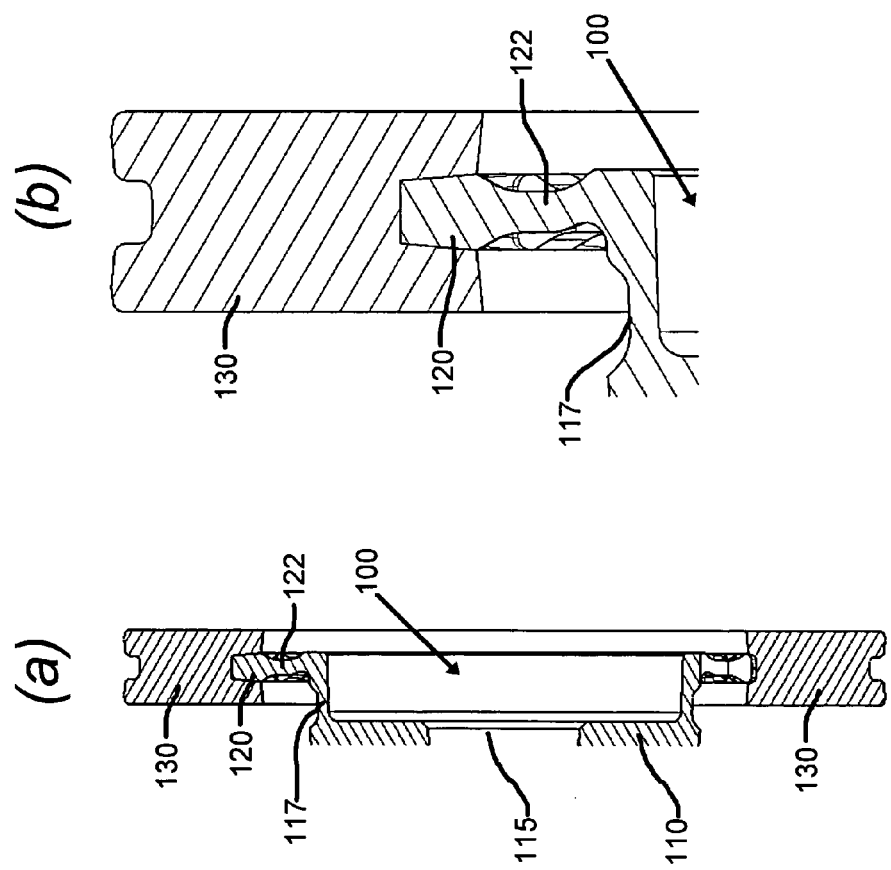

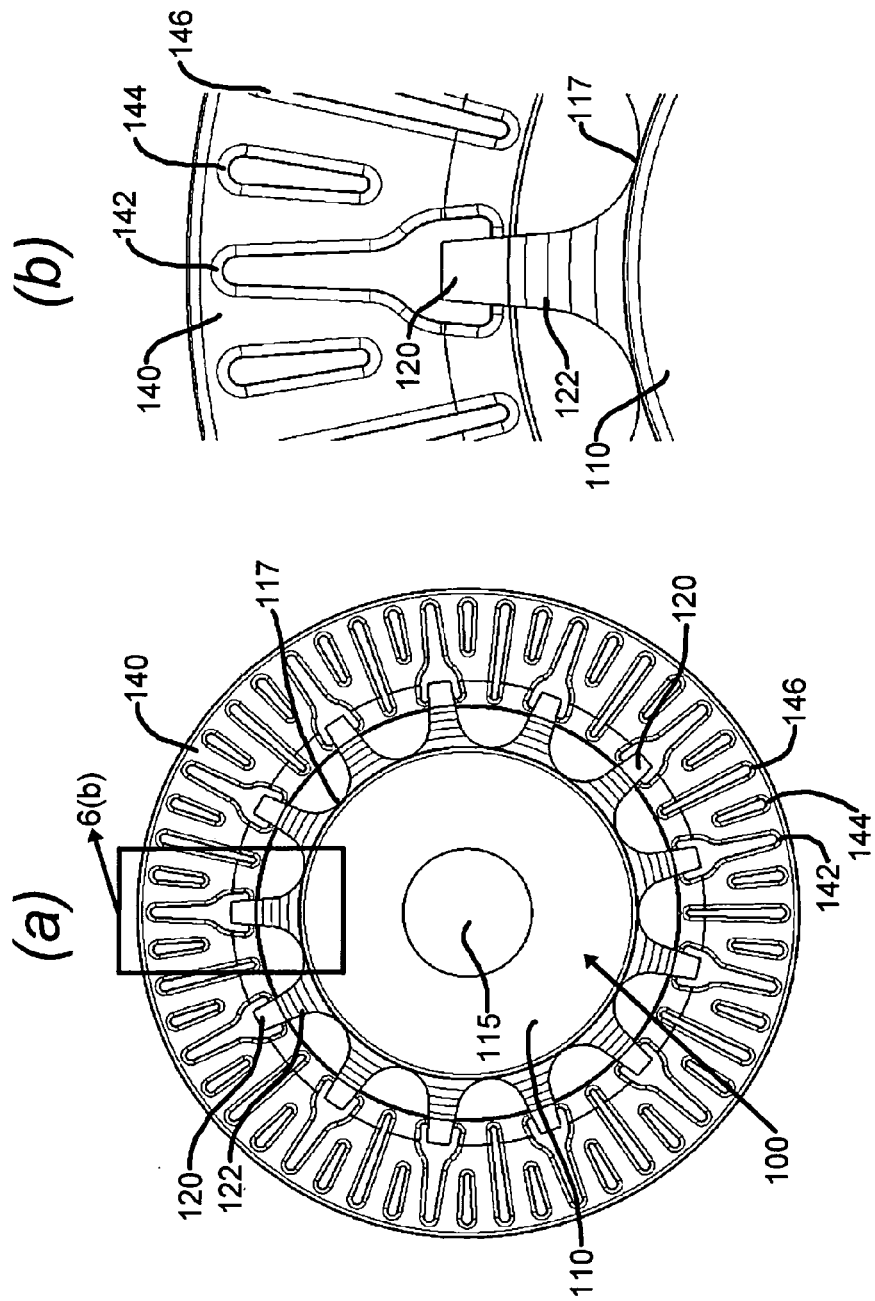

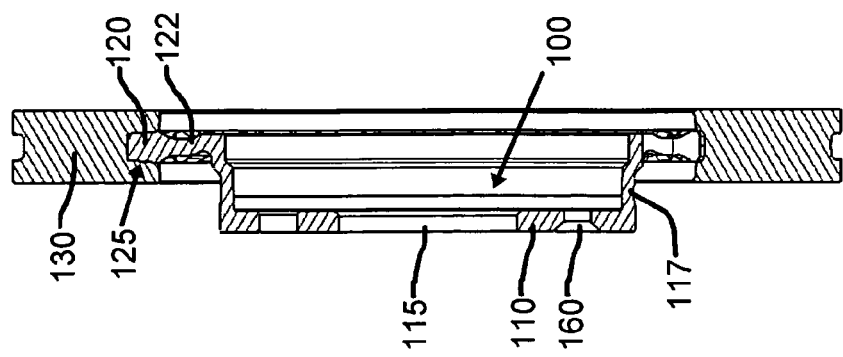
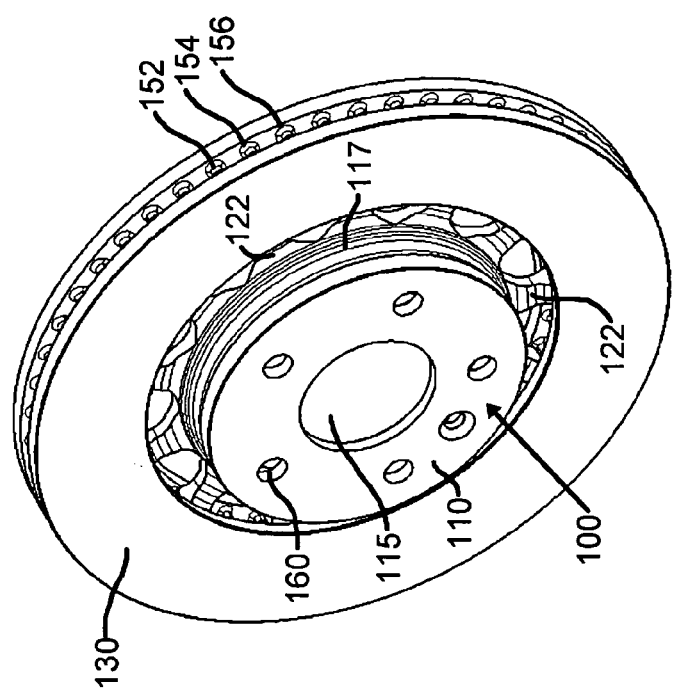

COMPOSITE BRAKE DISC

RELATIONSHIP TO OTHER APPLICATION

This application is a US national stage filing under 35 U.S.C. §371 of International Application No. PCT/US2009/002880 filed on May 8, 2009 and claims the benefit under 35 U.S.C. §119(e) of U.S. Provisional Patent Application Ser. No. 61/127,272 filed on May 8, 2008. The disclosure of this provisional patent application is incorporated herein by reference.

BACKGROUND OF THE INVENTION

1. Field of the Invention

This invention relates generally to brake discs for motor vehicles, and more particularly, to a composite brake disc arrangement formed of two cast portions, a mounting portion and a brake band portion, the two portions forming a frictional interface.

2. Description of the Related Art

Brake discs that conventionally are formed of a combination of a mounting portion and a brake plate portion employ, in some known arrangements, a continuous skirt extending radially outward of the mounting portion, the continuous skirt engaging a brake plate portion (i.e., brake band). The mounting portion is sometimes referred to as a "rotor hat," due to its raised central portion and a substantially cylindrical portion extending axially therefrom. This combination, particularly with a continuous skirt extending radially from the cylindrical portion and disposed axially distal from the central portion gives the general appearance of a hat. It is also known as the "mounting bell."

In the known art, the engagement between the continuous skirt and the brake plate portion is achieved in a plurality of ways. One engagement method involves direct communication between the mounting portion and the brake plate portion, thereby forming a continuous product. In other known connection arrangements, fingers radiate radially inward from the brake plate portion and at connected by fasteners to the continuous skirt. The radially inwardly extending fingers can be formed integrally with the brake plate portion. In these known arrangements, the mounting portion and the brake plate portion are so firmly attached to one another that they operate as a single element.

It has been recognized that heating of the brake plate portion during manufacture and use in a motor vehicle will cause various forms of warpage and deformation, particularly including radial deformation. On known approach to alleviating this problem is to employ radially inwardly directed fingers, which are formed integrally with the brake plate portion, and communicate with the mounting portion. The fingers, however, are able to be displaced radially, thereby arguably enabling radial dilation of the brake plate portion so as to accommodate the radial deformation. There is no mechanism in the known arrangement that will reduce vibration during braking, notwithstanding that the mounting portion and the brake plate portion have a small measure of separation between them.

There is a need, therefore, for a brake disc arrangement that is characterized with increased dampening over conventional brake disc arrangements.

There is a further need for a brake disc arrangement that exhibits reduced deformation in response to thermal and mechanical loading during service in a motor vehicle, and during the manufacturing process.

There is additionally a need for a brake disc arrangement that is characterized with an overall reduced mass.

SUMMARY OF THE INVENTION

The foregoing and other needs and objects of the invention are satisfied and achieved by this invention, which provides, in accordance with a first apparatus aspect, a brake disc arrangement of the type having a mounting portion and a brake plate portion. In accordance with the invention, there is provided a radial protuberance extending radially outward from the mounting portion. The radial protuberance has a radially distal tip portion. A coating is arranged to surround the radially distal tip portion, such that when the brake plate portion is cast to surround the radially distal tip portion, the coating functions to prevent the brake plate portion from welding to the radially distal tip portion.

In accordance with one embodiment of the invention, there are provided a plurality of the radial protuberances. The plurality of radial protuberances are arranged to be substantially coplanar with respect to each other. In a further embodiment, the plurality of radial protuberances are integrally formed with the mounting portion.

The radial protuberance is, in one embodiment, formed of metal. Moreover, the radially distal tip portion is subjected to an electrical discharge machining (EDM) process that increases a dampening characteristic of the metal in the region of the radially distal tip portion.

A sand core facilitates the casting of the brake plate portion to surround the radially distal tip portion. In one embodiment, the sand core is provided with a plurality of apertures therethrough for forming corresponding pillars between two halves of the brake plate portion during casting.

The coating must be able to withstand the temperature of the molten metal during the casting of the brake plate portion. In one embodiment, the coating is formed of a ceramic material.

In accordance with a further apparatus aspect of the invention, there is provided a brake disc arrangement having a mounting portion formed of a metal, the mounting portion having a plurality of radial protuberances extending radially outward therefrom. At least some of the radial protuberances each have a radially distal tip portion. A ceramic coating is applied to the radially distal tip portion of at least some of the radial protuberances. The brake plate portion is cast so as to surround the radially distal tip portions. However, it is isolated therefrom by the ceramic coating.

In one embodiment of this further apparatus aspect of the invention, at least some of the radially distal tip portions are formed of metal having a microstructure created by EDM. Additionally, the radial protuberances that have radially distal tip portions have a microstructure that has been created by EDM. Such radial protuberances are substantially equally distributed around the mounting portion.

In accordance with a method aspect of the invention, there are provided the steps of:

forming a mounting portion having a plurality of integrally formed radial protuberances;

applying a ceramic coating to the radial protuberances; and casting a metal brake plate portion so as to surround the radial protuberances with molten metal.

In one embodiment of this method aspect of the invention, prior to performing the step of applying a ceramic coating there is provided the step of machining the radial protuberances. In a further embodiment, prior to performing the step of applying a ceramic coating there is provided the step of subjecting at least some of the radial protuberances to electrical discharge machining (EDM). There is additionally provided the step of distributing the at least some of the radial protuberances to EDM substantially equally around the mounting portion.

In a further method embodiment, the step of casting a metal brake plate portion includes the further step of forming a sand core that holds the mounting portion in a predetermined fixed orientation. The step of casting the metal brake plate portion includes, in a further embodiment, the step of pouring the molten metal onto the sand core. Such pouring includes in still further embodiments the step of pouring the molten metal onto the sand core and the formation of pillars within an interior portion of the brake plate portion.

In yet a further embodiment of the invention, prior to performing the step of pouring the molten metal onto the sand core, there is provided the further step of forming a core box mold. In this embodiment, the step of pouring the molten metal onto the sand core includes the step of pouring the molten metal into the core box mold. It is important in the practice of the invention to ensure that the metal brake plate portion does not weld to any of the plurality of integrally formed radial protuberances.

The unique two-part design of the brake disc of the present invention enables design considerations, such as thinner wall sections, to be achieved, while simultaneously reducing mass. The specialized fabrication of the mounting portion creates localized areas of high dampening, thereby significantly reducing the propensity for vibration of the entire part. Finally, the independent, yet constrained, interaction between the mounting section and plate section allows each segment to react to external stimulus without affecting the other, thus reducing the overall deformation of the part under mechanical and thermal loading.

BRIEF DESCRIPTION OF THE DRAWINGS

Comprehension of the invention is facilitated by reading the following detailed description in conjunction with the annexed drawings, in which:

FIG. 2(a) is a partially cross-sectional side view representation of the cast mounting portion of FIG. 1; FIG. 2(b) is an enlarged cross-sectional representation showing in greater detail a mounting section of the cast mounting portion; and FIG. 2(c) is an enlarged representation of the mounting section of FIG. 2(b) of the cast mounting portion;

FIG. 5(a) is a partially cross-sectional representation of the cast brake disc of FIG. 3; FIG. 5(b) is an enlarged partially cross-sectional representation of the interconnection between the cast mounting portion and the cast brake band portion;

FIG. 6(a) is a plan representation of the interior of the cast brake disc of FIG. 3 during manufacture, showing a sand core; and FIG. 6(b) is and enlargement of a portion of the plan representation of FIG. 6(a) showing additional detail of the interconnection between the cast mounting portion and the sand core prior to casting of the cast brake band portion;

FIG. 7 is a simplified schematic perspective representation of a cast brake disc showing the cast mounting portion combined with a cast brake band portion, and further showing the cast mounting portion with apertures therethrough for mounting onto the axle of a motor vehicle; and FIG. 8 is a partially cross-sectional side representation of the completed cast brake disc of FIG. 7.

DETAILED DESCRIPTION

The brake disc arrangement of the present invention is formed of essentially two parts. These are, as will be described in detail herein, a mounting portion and a brake plate portion. The manufacture of the mounting and brake plate portions will result in a brake disc wherein the mounting portion is physically constrained by the brake plate portion. Nevertheless, both such portions respond to external stimulus independently of each other. The result is a brake disc that is advantageously characterized by increased dampening, reduced deformation during service and manufacturing, and reduced mass.

Figure 1:
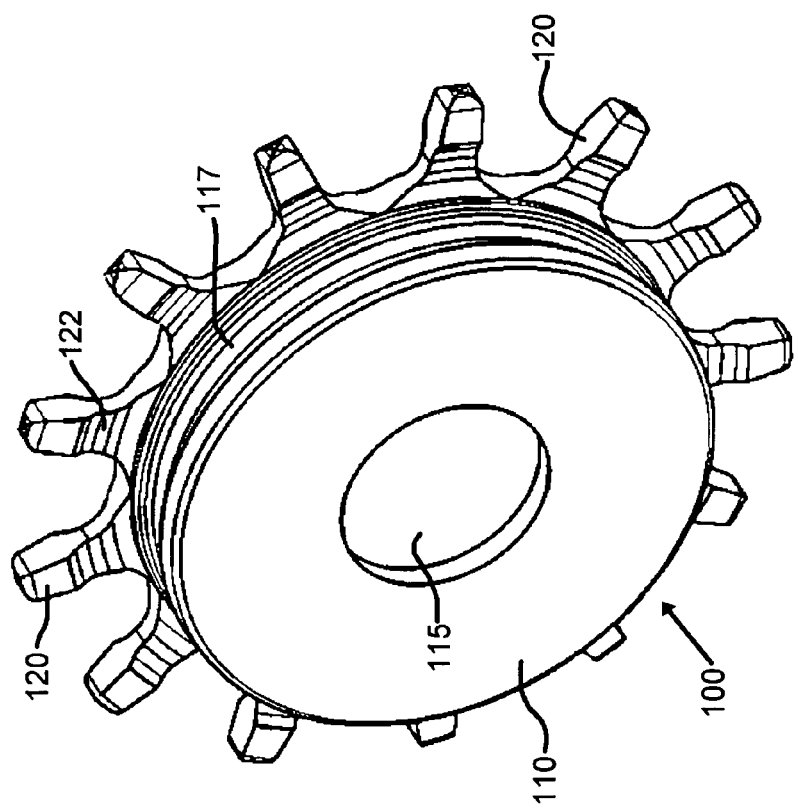
FIG. 1 is a simplified schematic perspective representation of a cast mounting portion for use in a brake disc arrangement in accordance with the invention.

FIG. 1 is a simplified schematic perspective representation of a cast mounting portion 100 for use in a brake disc arrangement (not shown in this figure) in accordance with the invention. As will be described hereinbelow, mounting portion 100 supports and constrains the brake plate portion (not shown in this figure) through several radial protuberances 122 that are distributed substantially equally around an outer circumference 117 of mounting portion 100. The use of radial protuberances 122, as opposed to a conventional circumferentially continuous section (not shown), contributes significantly to the attainment of mass reduction over conventional one-piece designs. As will be described below, radial protuberances 122 are configured to be accommodated the brake plate portion, and serve as the interaction point between the mounting portion and the brake plate portion.

In the practice of the invention, mounting portion 100 is produced first, separate from the brake plate portion. This manufacturing sequence wherein the mounting portion is cast separately from the brake plate portion facilitates the achievement of the advantage of permitting the use of significantly thinner wall-section thicknesses, compared to a conventional one-piece design. In this specific illustrative embodiment of the invention, this reduction in thickness, along with the use of radial protuberances 122, constitute the primary features through which the advantageous reduction in the mass of the brake disc (not shown in this figure) is achieved.

Mounting portion 100 has an integrally formed mounting surface 110. In this specific illustrative embodiment of the invention, mounting surface 110 has an aperture 115 therethrough that, upon completion of the manufacture of the brake disc, will facilitate its installation on the axle (not shown) of a motor vehicle (not shown).

In the manufacture of mounting portion 100 of this specific illustrative embodiment of the invention, a conventional sand molded casting process is employed. The mounting portion can be made of gray iron, aluminum, nodular iron, or other suitable metals. However, after completion of the casting of mounting portion 100, several additional processing steps are required in preparation for the joining thereto of the brake plate portion.

FIG. 2(a) is a partially cross-sectional side view representation of mounting portion 100, as described previously in relation to FIG. 1. FIG. 2(b) is an enlarged cross-sectional representation showing in greater detail a radial protuberance 122 of mounting portion 100. Additionally, FIG. 2(c) is an enlarged representation of radial protuberances 122 of mounting portion 100. Elements of structure that have previously been discussed are similarly designated.

As shown in these figures, radial protuberances 122 extends radially outward from outer circumference 117. Each of radial protuberances 122 has integrally formed therewith a tip portion 120. Each tip portion 120 has an external surface 125. In order to achieve the design goals of increasing dampening and reducing deformation during service and manufacturing, external surface 125 is machined in a conventional manner. Such machining enables greater control over the surfaces, which is advantageous during further processing.

Following traditional machining, it is necessary to subject external surface 125 of tip portion 120 of several radial protuberances 122 to electrical discharge machining (EDM). Generally, the principal purpose of the EDM process is to remove material. A secondary result of this process, however, is a change within the microstructure of the metal. This change in the microstructure provides the advantage of increasing greatly the dampening properties of the metal in the area subjected to EDM, a very useful secondary effect. In the practice of the invention, the EDM process is applied to several, not necessarily all, of radial protuberances 122 to create areas with high dampening characteristic. This dampening is achieved by dissipating common modes of vibration with the brake plate portion.

In the practice of this embodiment of the invention, the results desired from the application of the EDM process are best achieved when some, not all, of the radial protuberances 122 are subjected to the EDM process. It is preferable that the radial protuberances 122 that are processed using EDM are substantially equally spaced around the circumference of mounting portion 100. This is done so that there will be distinct areas distributed around the entire brake plate portion of very high dampening, available to keep vibration from increasing and propagating around the brake plate portion.

Following the EDM process, a ceramic coating (not shown) is applied to all of radial protuberances 122. The ceramic coating is of a thickness that will preclude welding between the tip portions of the radial protuberances and the brake plate portion. During the formation of the brake plate portion, as will be discussed below, molten metal will be poured around the radial protuberances 122 of mounting portion 100. If the brake plate portion and the mounting portion 100 weld together during this step, the benefits achieved by the present invention will in large measure be lost because the mounting portion and the brake plate portion will not be able to behave as two separate bodies. Upon completion of the application of the ceramic coating, mounting portion 100 is ready to be combined with the brake plate portion, as follows.

Figure 4:
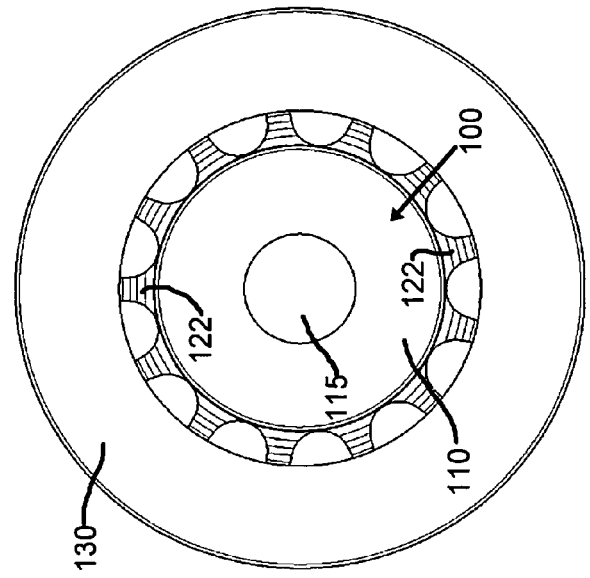
FIG. 4 is a plan representation of the cast brake disc of FIG. 3.
Figure 3:
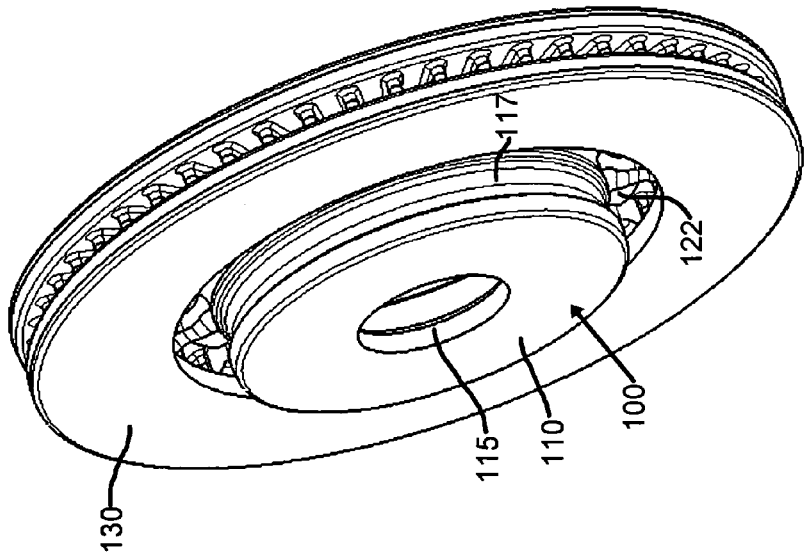
FIG. 3 is a simplified schematic perspective representation of a cast brake disc showing the cast mounting portion combined with a cast brake band portion.

FIG. 3 is a simplified schematic perspective representation of a cast brake disc (not specifically designated) showing the cast mounting portion 100 with a cast brake plate portion 130. FIG. 4 is a plan representation of the cast brake disc of FIG. 3. Elements of structure that have previously been discussed are similarly designated. The brake plate portion of a brake disc is also known in the art as a brake band.

It is seen in these figures that brake plate portion 130 is installed to surround circumferentially mounting portion 100. Although portions of radial protuberances 122 are visible in these figures, tip portions 120 are contained within the inner circumference of brake plate portion 130 and therefore cannot be seen in these figures.

FIG. 5(a) is a partially cross-sectional representation of the cast brake disc of FIGS. 3 and 4. FIG. 5(b) is an enlarged partially cross-sectional representation of the interconnection between cast mounting portion 100 and cast brake plate portion 130. Elements of structure that have previously been discussed are similarly designated.

It is seen in FIGS. 5(a) and 5(b) that tip portions 120 of radial protuberances 122 are surrounded within the inner circumference (not specifically designated) of brake plate portion 130. The combining of mounting portion 100 and brake plate portion 130 is actually the addition of one part to the other. More specifically, the brake plate portion 130 is, in this embodiment of the invention, cast around radial protuberances 122 of mounting portion 100. However, it is critical that mounting portion 100 be maintained in correct and precise orientation while the metal for cast brake plate portion 130 is being poured and cooled. In the practice of a specific illustrative embodiment of the invention, this problem is solved by using a sand core.

FIG. 6(a) is a plan representation of the interior of the cast brake disc of FIG. 3 during manufacture, showing a sand core 140. FIG. 6(b) is and enlargement of a designated portion of the plan representation of FIG. 6(a), and shows greater detail of the interconnection between mounting portion 100 and sand core 140 prior to casting of the brake band portion (not shown in this figure).

In a conventional one-piece design of a brake disc, the brake plate portion is formed using a combination of two sand molds (not shown) with a sand core, such as sand core 140 sandwiched between. The sand-core enables the production of a detailed geometry, and is held in place by the two sand molds on either side of the sand core. In the practice of this embodiment of the invention, mounting portion 100 is combined with sand core 140 to ensure that proper orientation is maintained throughout the process of casting the brake plate portion. In this embodiment, sand core 140 is produced by blowing sand (not specifically designated) into a mold, typically called a "core box." By inserting mounting portion 100 into the core box, and then blowing the sand around it to produce the sand core, the result is a combination sand core/mounting portion article.

The combination sand core/mounting portion article is then inserted between the two sand mold sections as if it were a typical sand core. The sand-molds hold the combination sand core/mounting portion article in proper alignment, ensuring that the cast brake plate portion solidifies correctly around the radial protuberances 122 of mounting portion 100. Since the ceramic coating precludes welding between the brake plate portion and the mounting portion during casting of the brake plate portion, there is thereby produced a system of two parts that are constrained together, but which react independently to stimulus. Because of the independent relationship, the deflection/deformation of the brake plate portion during both machining and application as a vehicle brake will greatly be reduced.

It is additionally seen in FIGS. 6(a) and 6(b) that sand core 140 has apertures therethrough. In this regard, see apertures 142, 144, and 146 in FIG. 6(b). As will be seen in relation to FIG. 7, below, these apertures enable the creations of pillars between the two halves of brake plate portion 130. More specifically, some of the molten metal (not shown) that is poured during the process of casting brake plate portion 130 is accommodated within the apertures to form the pillars.

FIG. 7 is a simplified schematic perspective representation of a cast brake disc showing mounting portion 100 combined with brake plate portion 130, and further showing mounting apertures 160 therethrough for enabling mounting of the brake disc onto the axle of a motor vehicle (not shown). Elements of structure that have previously been discussed are similarly designated.

It is seen in this figure that there are provided pillars, such as pillars 152, 154, and 156 interposed between the two halves of the brake plate portion. In this specific illustrative embodiment of the invention, pillar 152 is the result of molten metal entering aperture 142 (FIGS. 6(*a*) and 6(*b*)); pillar 154 is formed as a result of the presence of aperture 144; and pillar 156 is the result of aperture 146. It is to be understood that the apertures in sand core 140 and the resulting pillars in brake plate portion 130 are replicated about the circumference of brake plate portion 130. In addition, the apertures and resulting pillars are not limited to the configuration shown in the present figures. Persons of skill in the art can produce additional and different aperture and corresponding pillar configurations without departing from the claimed invention.

Following the casting of the brake plate portion around the mounting portion, there remains the process of final machining of the complete brake disc part. In the practice of this specific illustrative embodiment of the invention, machining is effected in the same way as a conventional one-piece design. However, the present invention affords less deformation, which results in increased processing control and significantly increasing the likelihood that lower tolerance machining geometric and dimensional specifications can be achieved.

FIG. 8 is a partially cross-sectional side representation of the completed cast brake disc of FIG. 7. Elements of structure that have previously been discussed are similarly designated. FIG. 8 shows the cast brake disc after machining.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A brake disc arrangement of the type having a mounting portion and a brake plate portion, the brake disc arrangement comprising:

a plurality of radial protuberances extending radially outward from the mounting portion, each radial protuberance of the plurality of radial protuberances having a radially distal tip portion;

a coating arranged to surround the radially distal tip portion;

wherein the brake plate portion is cast to surround the radially distal tip portion, said coating functioning to prevent the brake plate portion from welding to the radially distal tip portion such that the mounting portion and the brake plate portion are constrained but configured to react independently so as to behave as two separate bodies to facilitate reducing overall thermal deformation of the brake disc arrangement, wherein the radial distal tip portions of a first portion of radial protuberances of the plurality of radial protuberances have been subjected to an electrical discharge machining (EDM) process to increase a dampening characteristic of each radial protuberance in a region of its radially distal tip portion, wherein the radial distal tip portions of a second portion of radial protuberances of the plurality of radial protuberances have not been subjected to the EDM process, wherein the radial distal tip portions subjected to the EDM process are substantially equally spaced around a circumference of the mounting portion so as to define distinct areas distributed around the brake plate portion of very high dampening to thereby keep vibration from increasing and propagating around the brake plate portion.

2. The brake disc arrangement of claim 1, wherein said plurality of radial protuberances are integrally formed with the mounting portion.

3. The brake disc arrangement of claim 1, wherein there is provided a sand core for facilitating the casting of the brake plate portion to surround the radially distal tip portion.

4. The brake disc arrangement of claim 3, wherein said sand core is provided with a plurality of apertures therethrough for forming corresponding pillars between two halves of said brake plate portion during casting.

\* \* \* \* \*